INVENTORS.
Ralph E. Ayres
Theodore P. Seda

3,614,812
APPARATUS FOR MANUFACTURING HOLLOW THERMOPLASTIC ARTICLES

Ralph E. Ayres and Theodore P. Seda, Midland, Mich., assignors to The Dow Chemical Company, Midland, Mich.
Filed Aug. 14, 1968, Ser. No. 752,722
Int. Cl. B29f 1/00
U.S. Cl. 18—30 RV   7 Claims

ABSTRACT OF THE DISCLOSURE

A method and apparatus for making hollow thermoplastic articles, particularly small articles such as pharmaceutical capsules, pipe thread covers, unit-serve coffee cream containers, and the like. The method involves registering of a distributor and a die adjacent an extruder orifice wherein a given quantity of plasticized material meters through a feed slot of the distributor into a cavity of the die. A mold plug is then driven forward into the cavity to force the plasticized material to take the shape of the desired article of manufacture. After the plasticized material has cooled sufficiently, the mold and die are separated and the formed article is ejected.

DESCRIPTION OF THE INVENTION

This invention concerns a method and apparatus for making hollow thermoplastic articles, particularly articles of relatively small size. Examples of such articles can be pharmaceutical capsules, pipe thread covers, unit-serve coffee cream containers, and the like. With such articles, it is necessary that they be formed quickly in mass quantities and that the formation thereof be precise so that no significant waste from the materials used in forming the articles results.

It has been discovered that by taking a basic concept which is sometimes used for making beads of thermoplastic polymers, such as suggested in U.S. Pat. No. 3,003,193, for example, with certain modifications and adaptations, it is possible to so precisely form small hollow articles of such materials as extrudable methyl cellulose. Accordingly, it is an object of the present invention to take a given precise quantity of plasticized material just sufficient for forming a small article, and quickly mold such given precise quantity of plasticized material into a desired shape. It is a further object to form quickly a plurality of such articles in each molding cycle.

Yet additional objects and advantages of the present invention are even more apparent when taken in conjunction with the accompanying drawing in which like characters of reference designate corresponding material and parts throughout the several views thereof, in which.

Figure 1:
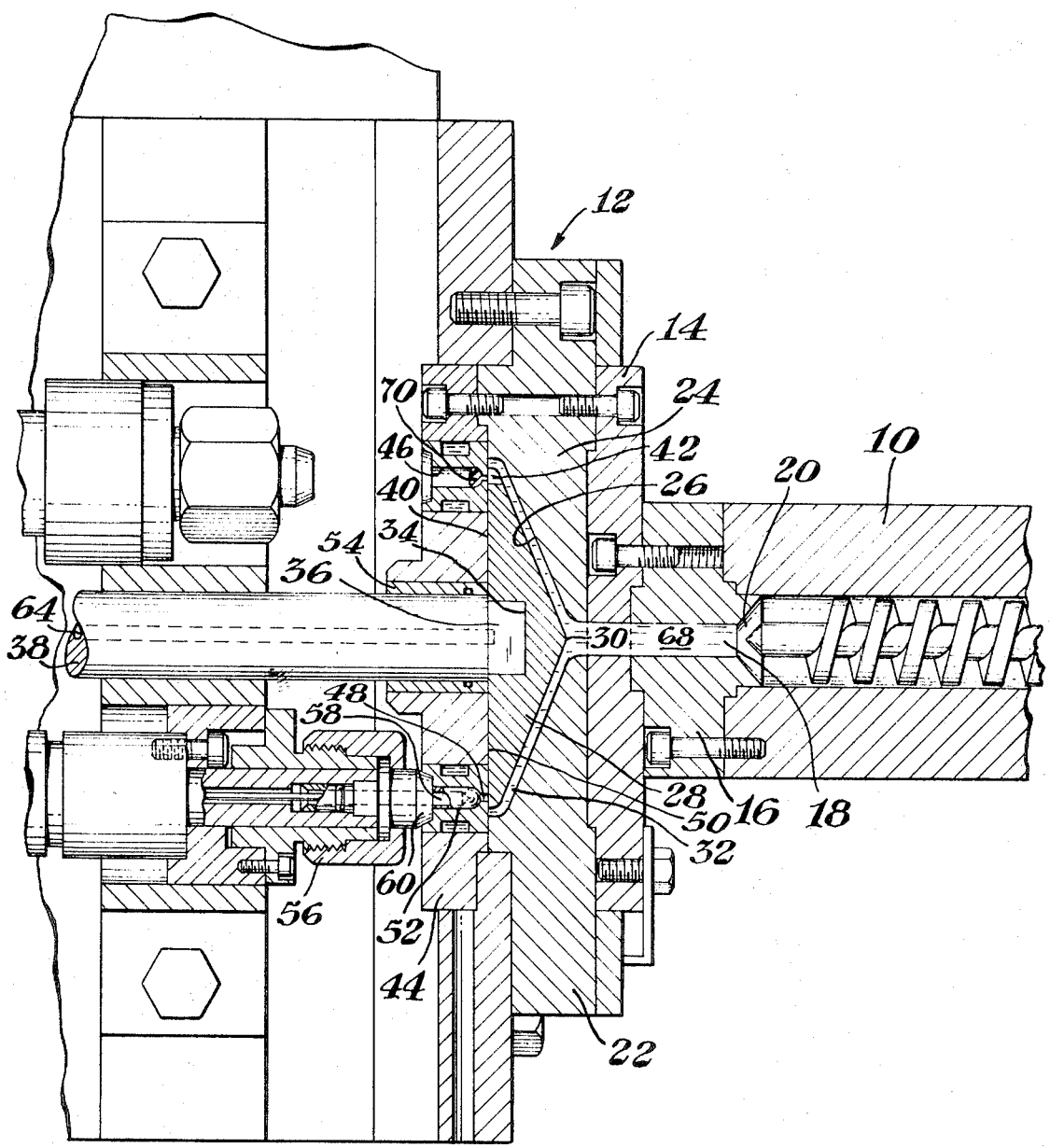
FIG. 1 is a longitudinal sectional view of apparatus suitable for practice of the invention, and including a standard plastic extruder at the right end thereof.
Figure 2:
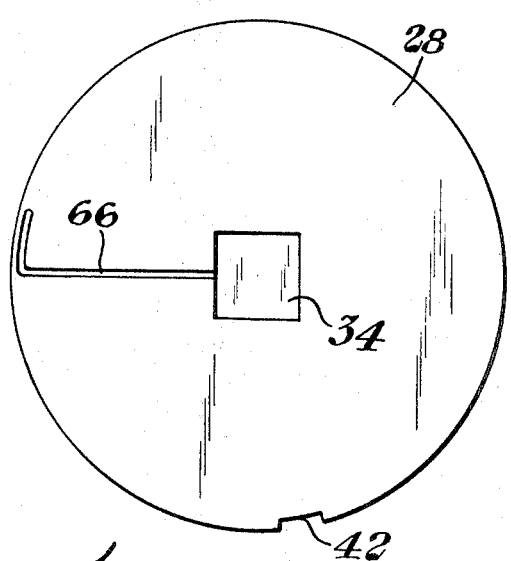
FIG. 2 is an end view of the rotor of the apparatus.

Referring now more particularly to the drawing, connected directly to a standard extruder 10 is a capsule forming apparatus 12 constructed according to the principles of the present invention. Extruder 10 is bolted to a face plate 14 of apparatus 12 through a head 16, the face plate and head including a port 18 mating with extruder orifice 20. Located behind face plate 14 is a distributor 22 including a main body element 24 having a recessed portion 26, and a rotor 28 having a projecting portion 30 mated with but spaced from said recessed portion 26 to define a conically shaped feed passageway 32 in open communication with port 18. This rotor 28 includes a center rectangular shaped cavity 34 which is engaged with a mating rectangularly shaped stud 36 of a drive shaft 38, whereby rotation of rotor 28 can be effected by the drive shaft 38. The feed passageway 32 ends at the side 40 of the distributor 22 opposite from face plate 14. Rotor 28 includes a feed slot 42 which extends inwardly of the periphery of said rotor sufficient to be in open communication with a feed passageway 32 when the feed slot 42 is aligned therewith.

Located adjacent the feed slot 42 is a die 44. Die 44 is shown as having a pair of cavities 46. The number of cavities can be different than the number of feed slots or the same, depending on the number of articles to be produced per revolution of the rotor, as described in more detail hereinafter. There is a gate 48 at the end of each cavity 46 which gate is located inwardly of feed slots 42, so as to permit surface 50 of die 44 to close off the same, but positionable to register with feed slot 42 in rotor 28 when desired. Each of the cavities 46 takes the shape of the outer configuration of the article to be manufactured. In the embodiment shown, such article is one half of a pharmaceutical capsule 52. Die 44 remains stationary and is mounted by slip bearings 54 about drive shaft 38 so that relative rotation between the rotor 28 and the die 44 can be achieved.

Mold element 56 is reciprocally operated by a conventional hydraulic mechanism or the like, not shown in detail herein. It includes a back and forth reciprocating pin 58 (of a configuration to form the interior of capsule 52) and a stripper head 60. Stripper head 60 is also retractable, but retracts at a slower rate and to a lesser extent than the pin 58 so as to push the article, in this case capsule 52, off the pin 58, as shown most clearly in FIG. 4. The fully retracted position of the pin 58 and stripper head 60 is shown in the upper part of FIG. 1.

Figure 3:
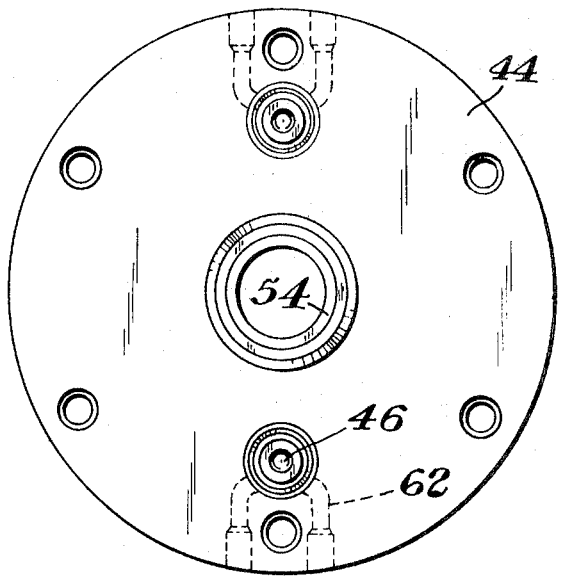
FIG. 3 is an end view of the die of the apparatus.
Figure 4:
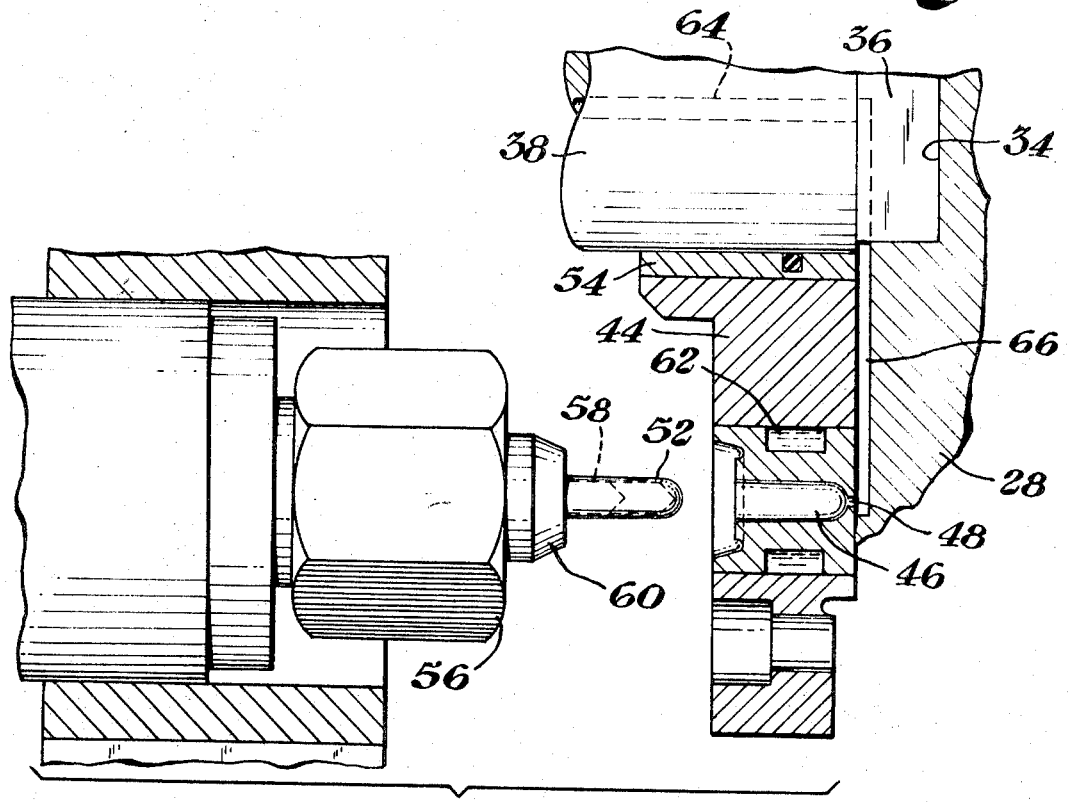
FIG. 4 is an enlarged view of a mold element and die section showing an article partially stripped from the mold.

Water or other coolant, from a conventional source not shown, is permitted to enter into the die 44 via passageway 62. Passageway 62 follows a return route about each cavity 46, as best seen in FIGS. 3 and 4, so as to provide for cooling of the plasticized material once it is formed about the pin 58.

In order to assist in removing the capsule from cavity 46, blow air can be forced through gate 48. Provision for this is effected by a hollow 64 extending longitudinally through drive shaft 38. The hollow 64 is in open communication with channel 66 in the face of rotor 28. Channel 66 extends from the center of rotor 28 to near the periphery thereof so as to be registerable with gate 48. A pressurized fluid, such as air, is introduced from a conventional source, not shown, to hollow 64 through channel 66 and into a gate 48 when such a gate is in registration therewith.

In operation, extruder 10 supplies plasticized material 68 under pressure to the port 18, and then through feed passageway 32 to the feed slots 42 of the distributor 22. Such plasticized material 68 can be extruded methylcellulose, homopolymers or copolymers of thermoplastic polyolefins such as polyethylene or polypropylene, polyvinyl chloride, and the like. As the rotor 28 rotates, a given quantity of plasticized material 68 passes through a feed slot 42 and gate 48, when the two come into alignment, and thence into the cavity 46. Such given quantity of plasticized material is identified in FIG. 1 as gob 70. This can be followed by an impact molding process wherein pin 58 is inserted under pressure into a cavity 46 and the gob 70 causing the gob 70 to be distributed about the pin 58, as shown in the lower half of FIG. 1. If an injection molding process were involved instead, the pin would already have been located within the cavity 46 when the gob 70 enters. The gob 70 would be under adequate pressure to form about the pin 58. In either event, the quantity of plasticized material deposited in the cavity is determined by the pressure and viscosity of the material, the feed slot width, the rotational speed of the rotor, and the diameter of the gate. These variables are preferable adjusted so that the weight deposited is equal to the weight of the aricle it is desired to make.

The area of the mold 44 adjacent each cavity 46 is maintained at a sufficiently low temperature by a coolant passing through passageway 62 such that the article 52 will cool quickly and maintain its shape when removed from the apparatus 12.

After the article 52 has cooled sufficiently, the mold 56 retracts the pin 58 causing it to be removed from the cavity 46. At the beginning of the retraction of the mold, or shortly thereafter, the continued rotation of the rotor 28 brings channel 66 into the register with the gate 48. Pressurized air is supplied through channel 66 which exhausts through the gate 48 and forces the removal of the formed article 52 from the cavity 46 onto pin 58.

As the mold 56 continues to retract, the rate of retraction of the pin 58 is greater than that of the stripper head 60 so that the stripper head pushes the capsule off the pin 58, as shown in FIG. 4, whereby the capsules can be collected as they drop out of the apparatus. After this has been accomplished the cycle is then ready to repeat.

If the apparatus has two cavities 46 and one feed slot 42, two articles will be produced with each revolution of the rotor. For higher production rates, the number of cavities and feed slots can be increased. The number of articles produced per each revolution of rotor 28 will be the number of cavities 46 multiplied by the number of feed slots 42.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An apparatus for forming hollow thermoplastic articles, said apparatus comprising, in combination, a means for receiving a source of plasticized material and forwarding the same to a distributor, said distributor including a rotor having a feeding slot carrying said plasticized material to a position adjacent a die, said die including a die cavity takng the outer configuraton of an article to be formed, a gate extending from the said die cavity to said distributor, said rotor adapted to register said feed slot with said gate for a predetermined period of time whereby a precise quantity of plasticized material enters said die cavity, and a male mold element mounted for reciprocal movement into and out of said die cavity and being spaced therefrom when in its inward position, said article being formable in the space between said mold element and said cavity.

2. The apparatus of claim 1 wherein said distributor includes a main body element with a conically shaped recessed portion, said rotor having a conically shaped projecting portion, the projecting portion mating with but spaced from the recessed portion to define a feed passageway, said feed passageway ending outwardly of said gate whereby a face of said die closes off the same, said feed slot located in said rotor to provide open communication between said feed passageway and said die cavity when said feed slot and gate are in registration.

3. The apparatus of claim 2 wherein said mold element includes a pin adapted to form the interior of said article, and a stripper head about said pin closing off the open end of said die cavity when in its closed position, said pin and said stripper head being retractable, said pin being retractable within said stripper head and to a greater extent than said stripper head whereby said article can be stripped from said pin by said stripper head.

4. The apparatus of claim 3 wherein said rotor includes a channel extending from its central area to a position adjacent the periphery of said rotor and outwardly of said gate, a drive shaft comprising part of the means for rotating said rotor, said drive shaft having a longitudinal hollow in open communication with said channel, a source of pressurized fluid feeding said hollow, whereby when said channel is in registration with said gate, said pressurized fluid ejects said article from said die cavity.

5. The apparatus of claim 4 wherein the die has a fluid passageway about said die cavity thereby permitting passage of a coolant adjacent said die cavity to aid in solidification of said plasticized material.

6. The apparatus from claim 3 wherein said plasticized material enters said cavity as a gob of a weight equal to the weight of the article to be formed, and means for impacting said pin under pressure against said gob after said gob is introduced into said die cavity.

7. The apparatus of claim 3 wherein said pin is positioned in said die cavity as said gob is introduced through said gate into said die cavity, said gob being under sufficient pressure to form about said pin and fill the space between said pin and die cavity.

References Cited

UNITED STATES PATENTS

| | | | |
|---|---|---|---|
| 2,363,808 | 11/1944 | Sayre | 18—30 RP |
| 2,390,266 | 12/1945 | Novotny | 18—30 RH |
| 2,733,493 | 2/1956 | Bryer | 18—2 RA UX |
| 2,770,011 | 11/1956 | Kelly | 18—30 RV |
| 3,013,308 | 12/1961 | Armour | 18—2 RP X |
| 3,125,801 | 3/1964 | Fields | 18—2 RP UX |
| 3,454,991 | 7/1969 | Rees | 18—2 RM X |
| 2,488,786 | 1/1949 | Watkins | 18—30 XV |

FOREIGN PATENTS

| | | | |
|---|---|---|---|
| 865,403 | 4/1961 | Great Britain | 18—30 XV |

J. SPENCER OVERHOLSER, Primary Examiner

M. O. SUTTON, Assistant Examiner

U.S. Cl. X.R.

18—2 RM

UNITED STATES PATENT OFFICE
CERTIFICATE OF CORRECTION

Patent No. 3,614,812           Dated October 26, 1971

Inventor(s)    Ralph E. Ayres et al.

It is certified that error appears in the above-identified patent and that said Letters Patent are hereby corrected as shown below:

Column 3, line 8, "aricle" should read -- article --; line 49, "takng" should read -- taking --. Column 3, lines 43 through 60 and in column 4, lines 1 through 8 should be deleted and the following inserted instead therefor, -- 1. An apparatus for forming hollow thermoplastic articles, said apparatus comprising, in combination, a means for receiving a source of plasticized material and forwarding the same to a distributor, said distributor including a rotor having a feed slot carrying said plasticized material to a position adjacent a die, said die including a die cavity taking the outer configuration of an article to be formed, a gate extending from said die cavity to said distributor, said rotor adapted to register said feed slot with said gate for a predetermined period of time whereby precise quantity of plasticized material enters said die cavity, said distributor including a main body element with a conically shaped recessed portion, said rotor having a conically shaped projecting portion, the projecting portion mating with but spaced from the recessed portion to define a feed passageway, said feed passageway ending outwardly of said gate whereby a face of said die closes off the same, said feed slot located in said rotor to provide open communication between said feed passageway and said die cavity when said feed slot and gate are in registration.

UNITED STATES PATENT OFFICE
CERTIFICATE OF CORRECTION

Patent No. 3,614,812      Dated October 26, 1971

Inventor(s)     Ralph E. Ayres et al.      PAGE - 2

It is certified that error appears in the above-identified patent and that said Letters Patent are hereby corrected as shown below:

---

2. The apparatus of claim 1 wherein said apparatus includes a male mold element mounted for reciprocal movement into and out of said die cavity and being spaced therefrom when in its inward position, said article being formable in the space between said male mold element and said die cavity. --.

Column 4, lines 36 and 37, each instance, "gob" should read -- plasticized material --.

Signed and sealed this 30th day of May 1972.

(SEAL)
Attest:

EDWARD M. FLETCHER, JR.          ROBERT GOTTSCHALK
Attesting Officer                  Commissioner of Patents